Jan. 16, 1951 W. KOHLHAGEN 2,538,528
METHOD FOR POISING BALANCE WHEELS OF TIME INSTRUMENTS
Filed Dec. 27, 1945 3 Sheets-Sheet 1
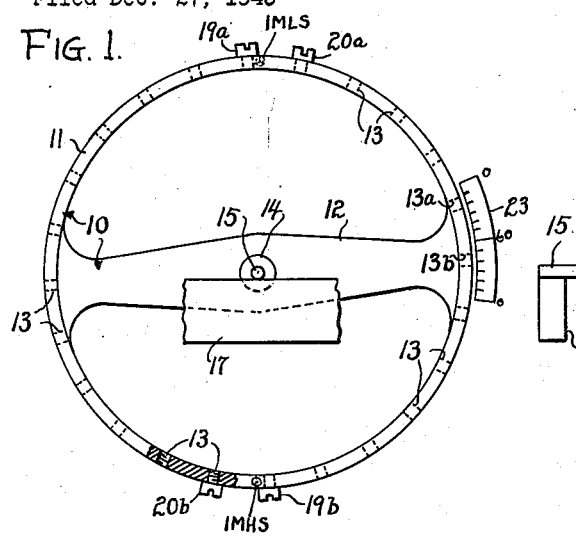
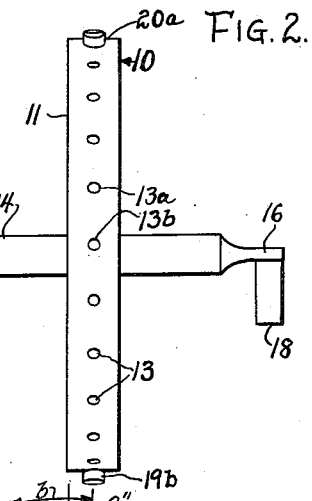
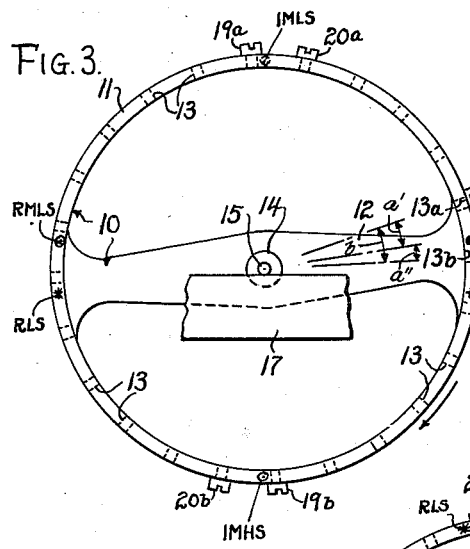
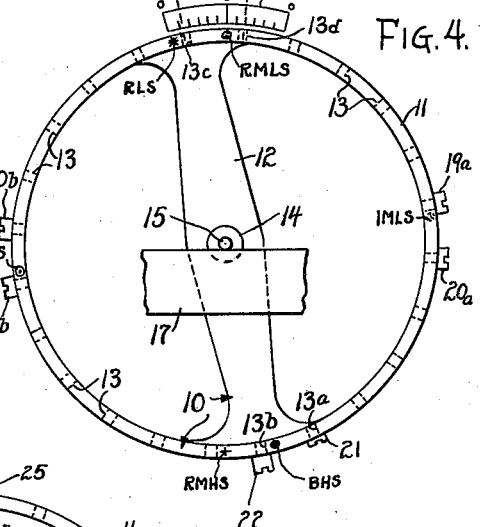
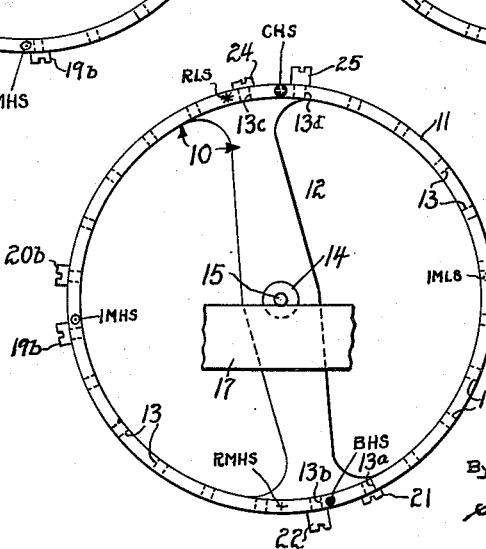
INVENTOR
WALTER KOHLHAGEN
By Seymour, Earle & Nichols
ATTORNEYS Jan. 16, 1951  W. KOHLHAGEN  2,538,528
METHOD FOR POISING BALANCE WHEELS OF TIME INSTRUMENTS
Filed Dec. 27, 1945  3 Sheets-Sheet 2

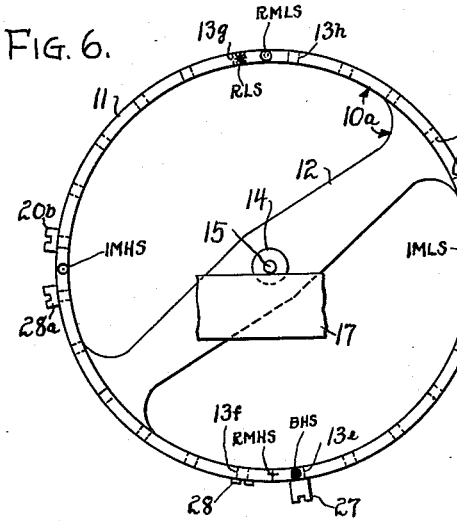
FIG. 6.

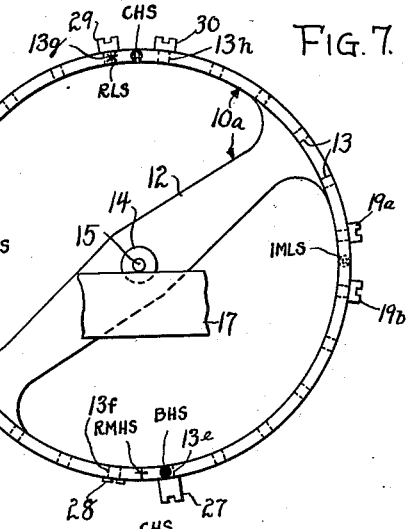
FIG. 7.

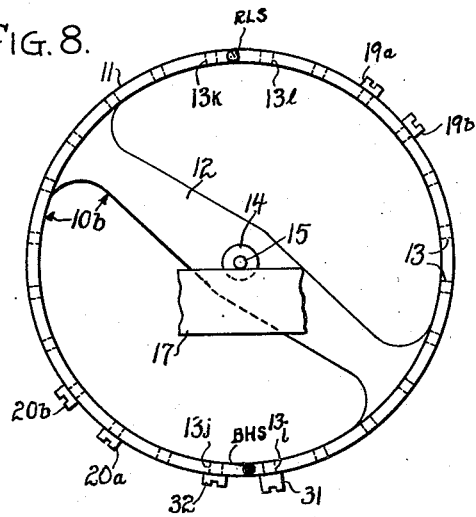
FIG. 8.

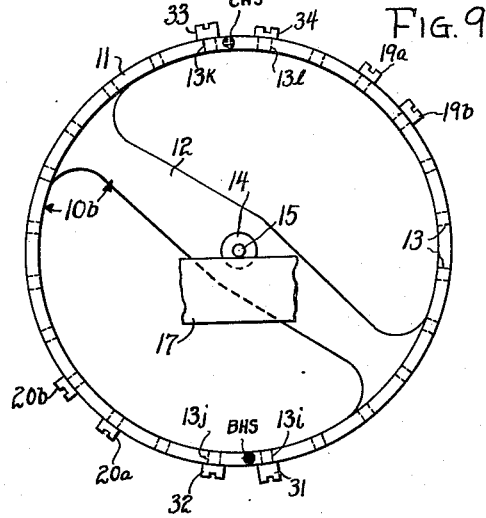
FIG. 9.

LEGEND:

IMHS = ⊙ = INHERENT MEAN HEAVY SPOT
IMLS = ⊚ = INHERENT MEAN LIGHT SPOT
BHS = ● = BALANCING HEAVY SPOT
RLS = ✶ = RESULTANT LIGHT SPOT
RMHS = + = RESULTANT MEAN HEAVY SPOT
RMLS = ⊛ = RESULTANT MEAN LIGHT SPOT
CHS = ⊕ = CORRECTING HEAVY SPOT

*INVENTOR*
WALTER KOHLHAGEN
By *Seymour, Carle & Nichols*
*ATTORNEYS*

Jan. 16, 1951  W. KOHLHAGEN  2,538,528
METHOD FOR POISING BALANCE WHEELS OF TIME INSTRUMENTS
Filed Dec. 27, 1945  3 Sheets-Sheet 3

INVENTOR
WALTER KOHLHAGEN
By
Seymour, Earle & Nichols
ATTORNEYS

Patented Jan. 16, 1951

2,538,528

UNITED STATES PATENT OFFICE 2,538,528

METHOD FOR POISING BALANCE WHEELS OF TIME INSTRUMENTS

Walter Kohlhagen, Hartford, Conn.

Application December 27, 1945, Serial No. 637,321

6 Claims. (Cl. 73—66)

1

The present invention relates to improvements in methods for poising or balancing the balance-wheels of watches, clocks and other time instruments, and relates more particularly to improvements in methods for poising or balancing the types of balance-wheels which are provided with a series of circumferentially-spaced-apart recesses for the reception of small weights which are usually in the form of screws.

One of the objects of the present invention is to provide a superior method whereby balance-wheels of the character referred to may be poised or balanced at low cost.

Another object of the present invention is to provide a superior method of the character referred to whereby balance-wheels may be poised or balanced without deleteriously affecting the appearance thereof.

A further object of the present invention is to provide a superior method of the character referred to and by means of which each of a plurality of similar balance-wheels may be poised or balanced by the addition of substantially an identical total amount of weight to thereby provide a lot of balanced or poised balance-wheels which are substantially uniform in weight and inertia.

Still another object of the present invention is to provide a superior method for poising or balancing balance-wheels of the character referred to whereby it becomes unnecessary to remove and replace weights obviating variations due to the strains imposed upon the balance-wheel by such removal and replacement.

With the above and other objects in view, as will appear to those skilled in the art from the present disclosure, this invention includes all features in the said disclosure which are within the scope of the appended claims.

In the accompanying drawings, in which certain modes of carrying out the present invention are shown for illustrative purposes:

Fig. 1 is a schematic face view of a balance-wheel for time instruments and showing the same mounted for gravity orientation after the application thereto of two pairs of timing-screws;

Fig. 2 is an edge view thereof;

Fig. 3 is a view similar to Fig. 1 but showing the addition to the balance-wheel of two balancing-screws;

Fig. 4 is a view similar to Fig. 3 but showing the reorientation of the balance-wheel as the result of the addition of the two balancing-screws above referred to;

Fig. 5 is a view similar to Fig. 4 but showing the addition to the balance-wheel of two correcting-screws to thus render the balance-wheel substantially poised or balanced;

Fig. 6 is a view similar to Fig. 4 but showing the reorientation of a balance-wheel having a lesser degree of inherent unbalance than the balance-wheel of the preceding figures;

Fig. 7 is a view similar to Fig. 6 but showing the provision of the balance-wheel of Fig. 6 with two correcting-screws;

Fig. 8 is a schematic face view of a balance-wheel having substantially no inherent unbalance and showing the same provided with two balancing-screws to produce a balancing heavy spot and a resultant light spot;

Fig. 9 is a face view of the balance-wheel of Fig. 8 but showing the same as provided with two correcting-screws to thus produce a correcting heavy spot in the location previously occupied by the resultant light spot;

Figure 10:
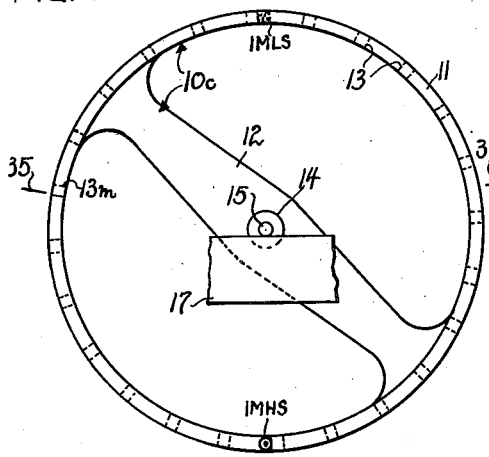
Fig. 10 is a face view of a balance-wheel showing another mode of applying the present method and showing the balance-wheel as gravity-oriented.

*The method as illustrated in Figs. 1 to 9 inclusive*

In Figs. 1 to 9 inclusive is illustrated a balance-wheel generally designated by the reference character 10 and comprising an annular rim 11 together with an integral diametrical-spoke 12. The rim 11 is provided with a circumferential series of spaced-apart recesses 13 which in the instance shown are threaded and adapted to receive the threaded shanks of suitable screws, all in a manner as will hereinafter appear.

Extending through the central portion of the spoke 12 of the balance-wheel 10 and rigid therewith is a balance-staff 14 having its longitudinal axis perpendicular with respect to the plane of the balance-wheel as is especially well shown in Fig. 2.

At each of its respective opposite ends the balance-staff 14 is reduced in size to provide bearing-terminals 15 and 16. The said bearing-terminals 15 and 16 are respectively adapted to rest upon the upper surfaces of poising-bars 17 and 18 arranged parallel with but spaced from each other in a horizontal plane.

The balance-wheel 10 above referred to and its balance-staff 14 are of a form common in the art, and it may here be noted that it has been the practice to utilize the threaded recesses such as 13 for the reception of timing-screws which are utilized to poise or balance the balance-wheel, as well as to effect proper timing thereof after the balance-wheel has been installed in a timepiece such as a watch or clock.

To secure commercially accurate operation of a recessed balance-wheel such as 10, a measurable degree of unbalance is permissible though it must be minute in amount. For purposes of convenience of description this permissible amount of unbalance will be sometimes hereinafter referred to as a "unit of permissible unbalance."

As has been above noted, the unit of permissible unbalance is intended to connote an amount of unbalance such as will not cause unsatisfactory performance of the balance-wheel 10 or its equivalent when installed in a timepiece. The said unit of permissible unbalance will for convenience and conciseness be sometimes hereinafter referred to as UOPU.

Balance-wheels of the general character of the balance-wheel 10 when manufactured with reasonable care very rarely possess more than 15 units of permissible unbalance and more often the degree of unbalance is far less than the 15 units referred to.

For purposes of convenience of description, however, it may be assumed that the balance-wheel 10 prior to being poised or balanced in the manner presently to be described, has been provided with two pairs of timing-screws 19a—19b and 20a—20b. The two pairs of screws just referred to are useful in effecting the timing of the balance-wheel after the same has been installed in a timepiece, and it is to be understood that their employment while preferred is not necessary to the functioning of the method of the present invention.

In the particular instance shown, the timing-screws 19a—19b and 20a—20b are preferably of equal weight-value to facilitate their interchange with timing-screws of greater or lesser weight-value after the balance-wheel has been poised and installed in a timepiece. The timing just referred to is a requirement independent of the poising of the balance-wheel, all as is well known in the art.

Also for purposes of description it may be assumed that the balance-wheel 10 prior to being balanced or poised does have 15 units of permissible unbalance centered about what may be termed an "inherent mean heavy spot" represented in the accompanying drawings by the reference characters IMHS.

It may further be assumed that the bearing-terminals 15 and 16 of the balance-staff 14 are respectively resting with almost frictionless engagement upon the upper surfaces of the poising-bars 17 and 18. Under these conditions the inherent mean heavy spot IMHS will come to the lowermost position while the inherent mean light spot IMLS will be located diametrically opposite, as is shown in Fig. 1.

The movement of the balance-wheel 10 as just above described will serve to definitely locate the inherent mean heavy spot IMHS as well as the inherent mean light spot IMLS.

Following the poising of the balance-wheel 10 in the position indicated in Fig. 1 it is proposed in accordance with the present invention, to provide the said balance-wheel with a balancing heavy spot BHS which is in the instance shown, centered about the location BHS (see Fig. 3) at a point about 83° displaced from the inherent mean light spot IMLS.

The balancing heavy spot BHS is provided by balancing-screws or -weights 21 and 22 respectively threaded into the recesses 13a and 13b immediately adjacent each of the respective opposite sides of the desired BHS.

The relative weight-values of the balancing-screws 21 and 22 will depend upon the relative distances which their respective recesses 13a and 13b are located from the desired location of BHS, all in a manner as will presently be described.

The sum of the weight-values of the balancing-screws 21 and 22 as effective at the desired BHS is preferably in excess of the maximum number of units of permissible unbalance which it may be expected to be possessed by the balance-wheel 10 in its condition as illustrated in Fig. 1. In the present instance the desired weight-value of BHS may be considered to have 60 units of permissible unbalance.

To determine the optimum weight-value for the respective balancing-screws 21 and 22, their respective distances from the desired BHS may be measured in any suitable manner. Thus in instances where it is intended to use the two recesses 13a and 13b respectively lying immediately adjacent the opposite sides of the desired BHS, their respective angular distances from BHS may be measured in any suitable manner.

For purposes of convenience of illustration it may be assumed that a graduated dial 23 illustrated in Fig. 1 is mounted adjacent the periphery of the balance-wheel 10 adjacent the location wherein it is desired to have BHS appear. Under the particular illustrative conditions here being described where BHS is to have a weight-value of 60 UOPU, the dial 23 may have its central graduation given a value of 60 and located radially in line with the desired location of BHS. Furthermore, the dial 23 may be provided with graduations on each of the respective opposite sides of its central graduation 60 with the end graduations indicating a zero value and each located at a distance from the central graduation corresponding to the angular distance between the respective recesses 13 in the balance-wheel 10.

By reference to Fig. 1 it will be seen that the recess 13a in the rim 11 is approximately located substantially opposite a point on the dial 23 indicating a weight-value of 16, while the other recess 13b may be observed to be substantially opposite a point on the dial 23 indicating a weight-value of about 44 UOPU. Accordingly, it is preferred that the balancing-screw 21 have a weight-value of 16 UOPU while the companion balancing-screw 22 should have a weight-value of 44 UOPU. Thus the sum of the weight-values of the balancing-screws 21 and 22 will be substantially the desired 60 UOPU, and since both of the said balancing-screws are so close to the desired location of BHS, for all normal purposes the value of BHS may now be viewed as approximately 60 UOPU.

Now when the balance-wheel 10 as shown in Fig. 3 is relieved of restraint it will turn by gravity and assume the position substantially as shown in Fig. 4 in which BHS has swung downwardly toward the lowermost point while the relatively-lighter IMHS has swung upwardly into a position adjacent the horizontal.

The degree of movement of the balance-wheel between the positions in which it is shown in Fig. 3 and the position in which it is shown in Fig. 4, will of course, depend upon the amount of movement required to cause this BHS to counterbalance the lighter IMHS, though it is to be noted that the latter has a greater lever advantage than the heavier BHS when the balance-wheel reaches the position shown in Fig. 4.

Considering the weight-values of IMHS and BHS as respectively being 15 UOPU and 60 UOPU, the position which the balance-wheel 10 will now assume (Fig. 4) will (ignoring slight frictional losses) result in what might be aptly termed, a "resultant mean heavy spot" RMHS locating itself at the lower portion of the rim 11 on the vertical center line. The resultant mean light spot RMLS (located diametrically - opposite RMHS) will locate itself at the upper portion of the circle on the vertical center line.

The value of RMHS under the conditions just above referred to, will be about 60 UOPU with RMLS having the same but negative weight-value.

To substantially perfectly poise the balance-wheel 10 after it is in the condition shown in Fig. 4, substantially 60 UOPU should be added so as to be effective at the point RMLS. Inasmuch, however, as the added weight must be applied in the available recesses adjacent the location of RMLS, the said desired weight may be added by inserting suitable correcting-screws 24 and 25 located on the respective opposite sides of RMLS as is shown in Fig. 5. The respective weight-values of the correcting-screws 24 and 25 (while adding up to about 60 UOPU) should be determined in accordance with the relative displacement of their respective recesses 13c and 13d from RMLS.

Accordingly, reference may be had to a dial 26 indicated in Fig. 4 which is similar to the dial 23 previously referred to, save that it has its central graduation positioned for radial-alignment with RMLS. By reference to the graduations on the dial 26, it will be ascertained that the recess 13c is so far removed from RMLS as to require that the weight-value of its correcting-screw 24 be only about 19 UOPU. On the other hand the companion recess 13d being located relatively-close to RMLS should have its correcting-screw 25 possessing a weight-value of about 41 UOPU.

The installation of the correcting-screws 24 and 25 as described, will result in providing the balance-wheel 10 with a correcting heavy spot CHS effective, as is indicated in Fig. 5, at the site previously occupied by RMLS.

The particular balance-wheel now being considered will have a remaining degree of unbalance (Fig. 5) of substantially zero units of permissible unbalance.

In the above instance the balance-wheel 10 was considered to have an inherent mean heavy spot equivalent to the expected maximum of 15 UOPU. It is now proposed to describe the effects of the method above described upon a balance-wheel 10a (Figs. 6 and 7) having its inherent mean heavy spot valued at only 7.5 UOPU. Reference may now be had to Figs. 6 and 7.

With IMHS having a value of 7.5 UOPU the same procedure may be followed as that previously described, namely, IMHS will be brought to a given location by gravity or otherwise such as the position shown in Fig. 1, following which the balancing heavy spot BHS will be provided by installing suitable balancing-screws 27 and 28 in recesses 13e and 13f respectively located on the opposite sides of BHS, as is indicated in Fig. 6.

To give the desired weight-value of 60 UOPU effective at BHS the angular distance between BHS and the recess 13e will indicate that the value of the screw or other weight 27 to be installed therein should be about 58 UOPU. Similarly, a determination of the angle between BHS and the recess 13f will indicate that the weight-value of the balancing-screw 28 should be about 2 UOPU.

Under the present conditions and as before noted, since IMHS is only one-half as heavy as the 15 UOPU previously described, IMHS will have risen substantially to the horizontal line while relatively-heavier BHS will locate itself closer to the vertical center line all as is illustrated in Figs. 6 and 7. RMHS, however, will be located at the lowermost point on the vertical center line while RMLS will be located at the upper point of the rim on the vertical center line.

A measurement of the distance of the two recesses 13g and 13h with respect to RMLS will indicate that the said recesses are equidistant from RMLS. Accordingly, correcting-screws 29 and 30 (each with a weight-value of 30 UOPU) may be respectively installed in the said recesses 13g and 13h (Fig. 7) to thereby bring the balance-wheel into substantially-perfect poise.

A careful calculation of the remaining unbalance in the balance-wheel after it has reached the condition illustrated in Fig. 7 will indicate that it is within 0.5 UOPU of perfect balance.

Occasionally it will occur that prior to being subjected to the present invention, a balance-wheel such as 10b of Figs. 8 and 9 (forming one of a lot) will already have perfect poise or balance and it is therefore proposed to demonstrate that such balance-wheels will still be useable after being subjected to the present method.

When an already perfectly-balanced balance-wheel such as 10b is placed upon the poising-bars, it will of course not turn since it has no inherent mean heavy spot such as IMHS of the preceding figures. Under these conditions it therefore may be assumed that the static position of the balance-wheel 10b is such that two of the adjacent recesses 13i and 13j are so located that their respective angular distances from the balancing heavy spot are 5 and 10 degrees. These angular distances would indicate that the recess 13i should have installed therein a balancing-screw 31 having a weight-value of 40 UOPU, while the recess 13j should have a balancing-screw 32 with a weight-value of 20 UOPU as indicated in Figs. 8 and 9.

Now when the balance-wheel 10b (after the installation of the balancing-screws 31 and 32) is relieved of restrain it will assume the position shown in Figs. 8 and 9 in which the balancing heavy spot BHS will swing downwardly into the lowermost position and on the vertical center line, while RLS will have moved upwardly to a point also on the vertical center line, as is indicated in Figs. 8 and 9.

The next step in bringing the balance-wheel 10a into poise would be to install suitable correcting-screws in the recesses 13k and 13L respectively located on the opposite sides of RLS shown in Fig. 8. Under the conditions above described a correcting-screw 33 should be installed in 13k and should have a weight-value of substantially 40 UOPU. A correcting-screw 34 having a weight-value of 20 UOPU should be installed in 13L in order to satisfy the requirements of substantially-perfect poise for the balance-wheel 10b, when in the condition illustrated in Fig. 9.

Obviously the balance-wheel 10b when brought to the stage illustrated in Fig. 9 will have its original perfect balance restored. Thus, while the balance-wheel 10b did not in fact require treatment by the present method, nevertheless it will be noted that as treated along with the lot of which it may form a part it was first caused to come into an unbalanced condition and then restored without the requirement of having to sort out balance-wheels which are already perfectly-balanced.

In the foregoing, two balancing-screws have been employed in each instance as is preferred, though if desired a single balancing-screw may be employed to deliberately alter the conditions in a given balance-wheel in order that the later step of applying a correcting heavy spot may be made use of, as will presently be described in connection with Figs. 10 to 13 inclusive.

With respect to the provision of a proper correcting heavy spot to the balance-wheels, the short cut of employing but one screw is not preferred, since the procedure of applying at least two correcting-screws gives more accurate results when IMHS is likely to have high weight-value, as is apt to be the case in at least one of a large lot of balance-wheels.

As before described, two correcting-screws are installed respectively in two immediately-adjacent recesses. It is not essential that the recesses just referred to be employed to provide either BHS or CHS, inasmuch as recesses remote from each other may be utilized by installing therein suitable correcting-screws after having determined the desired weight-values of such correcting-screws by measuring the angle between a chosen recess and either or both BHS—CHS. The use of other than immediately-adjacent recesses will be presently described.

In the foregoing description and in Figs. 1 to 9 inclusive, the balancing heavy spot BHS has been shown as located substantially 83° from IMLS. Substantially this angle is the optimum when it is desired to secure substantially-perfect poise when IMHS is equal to either zero UOPU or the maximum expected 15 UOPU. For practical purposes, however, the angle between BHS and IMLS may vary widely such, for instance, as between about 55° and 95°.

*The method as illustrated in Figs. 10 to 13 inclusive*

In the figures now being described there is shown a balance-wheel generally designated by the reference character 10c, and corresponding to the balance-wheels previously described and having its components and associated features bearing like reference characters.

In connection with the preceding balance-wheels 10, 10a and 10b, it was assumed for convenience of description that the maximum degree of unbalance which might be expected from any one of a lot of similar balance-wheels would be but 15 UOPU. In the present instance and for purposes of illustration, it may be assumed that the balance-wheel 10c is representative of a lot in which as much as 20 UOPU may be expected as a maximum.

In the present instance it may also be assumed that no timing-screws such as have previously been described, are employed and that the balance-wheel 10c is in the condition illustrated in Fig. 10, and in fact has 10 units of unbalance centered at the location IMHS.

It may further be assumed that the bearing-terminals of the balance-staff 14 of the balance-wheel 10c, are resting upon the upper surfaces of the poising-bars such as 17 and 18 in the manner indicated in Fig. 10. Under these conditions IMHS will come to the lowermost position while IMLS will be located diametrically opposite at the uppermost point, as is shown in Fig. 10.

It is to be further assumed that under the present conditions it is desired to apply to the balance-wheel 10c a balancing heavy spot centering substantially at a point located 80° from IMLS in order to provide ideal conditions for later correction when the expected amount of unbalance is from zero UOPU to 20 UOPU.

It is to be further assumed for purposes of convenience of description that two indicia-marks 35 and 36 are respectively located on the opposite sides of IMLS, each at a distance of about 80° therefrom, as is shown in Fig. 10.

It is to be further assumed that rather than employing two balancing-screws or their equivalent, as has been used in connection with the balance-wheels previously described, it is desired to employ only a single balancing-screw.

Figure 11:
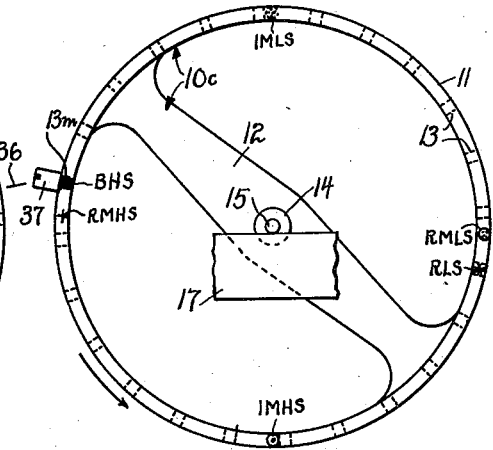
Fig. 11 is a face view of the balance-wheel of Fig. 10 after the same has been provided with a single balancing-screw.

Under the above conditions, the operator will observe which of the recesses 13 is nearest to either of the two indicia-marks 35 or 36. Under the conditions illustrated in Fig. 10, it will be observed that the recess 13m is closer to the indicia-mark 35 than is any one of the recesses 13 with respect to the indicia-mark 36. Accordingly, as is preferred, a balancing-screw 37 will be installed in the recess 13m, as is illustrated in Fig. 11. However, had one of the recesses 13 been closer to the indicia-mark 36, the balancing-screw 37 would preferably be installed in such recess. It may here be noted, however, that it is not necessary to be particular with respect to which of the recesses is closest to the desired location when the angular distance between recesses is small.

It may be assumed that the balancing-screw 37 has a weight-value of 60 UOPU, as will also similar balancing-screws to be employed in other balance-wheels of the lot.

Figure 12:
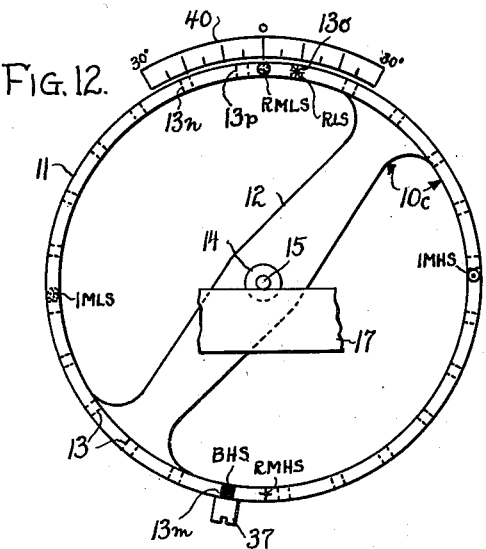
Fig. 12 is a face view of the balance-wheel of Fig. 11 after the same has been reoriented by gravity.
Figure 13:
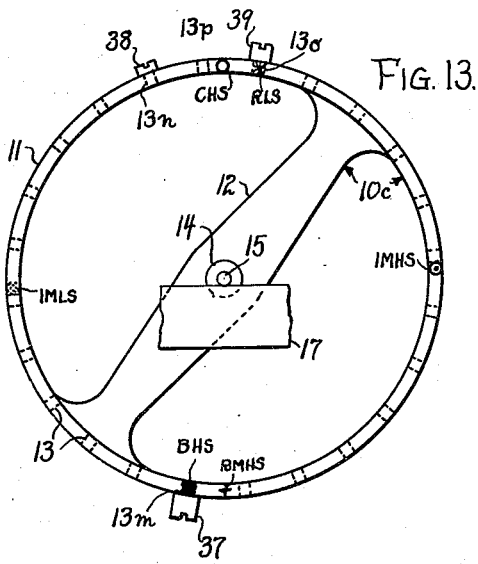
Fig. 13 is a face view of the balance-wheel of Fig. 12 after the same has been provided with two balancing-screws.

Now when the balance-wheel 10c in the condition in which it is shown in Fig. 11, is relieved of restraint, it will turn by gravity and assume the position substantially as shown in Fig. 12, in which BHS has swung downwardly toward the lowermost point while the relatively-lighter IMHS has swung upwardly.

As before explained, the degree of movement of a balance-wheel between the positions respectively shown in Figs. 11 and 12, will depend upon the amount of movement required to cause BHS to counterbalance the lighter IMHS.

The position which the balance-wheel 10c will now assume (Fig. 12) will be such that RMHS will locate itself directly on the vertical center line. RMLS will, under these conditions, locate itself at the uppermost portion of the rim also on the vertical center line.

Considering the weight-value of IMHS (and also IMLS) to be 10 UOPU and the weight-value of BHS (and also RLS) to be 60 UOPU, BHS will be located substantially 9.5° from RMHS and RLS will be located a similar distance from RMLS. RMHS and RMLS will have weight-values of 59.16 UOPU.

To poise the balance-wheel 10c within tolerable limits after it is in the condition illustrated in Fig. 12, substantially 60 UOPU may be added thereto so as to be effective substantially at the point RMLS. Under the specific circumstances here being considered, it is, of course, recognized that substantially perfect poise could be secured by applying 59.16 UOPU to be effective at the location RMLS. If the said 60 UOPU is applied as described, the remaining error in the balance-wheel will be well within 1 UOPU and will, in fact, be substantially the maximum error that may be expected from a balance-wheel from a lot like 10c, since at either 0 or 20 UOPU value suitable for IMHS, substantially perfect poise will be secured by the application of 60 UOPU in the form of suitable correcting-screws.

To secure the advantages of the present invention, the 60 UOPU may be added not directly at the site of RMLS but by inserting suitable correcting-screws 38 and 39 (Fig. 13) in the recesses 13n and 13o located on the respective opposite sides of RMLS, as is shown in Fig. 12.

The respective weight-values of the correcting-screws 38 and 39 should be determined in accordance with the angular displaceemnt of their respective recesses 13n and 13o with respect to RMLS.

Any suitable means may be utilized for determining the angular displacement above referred to, and for purposes of convenience it may be assumed that a dial 40 is located adjacent the balance-wheel as illustrated in Fig. 12.

The dial 40 above referred to may be graduated in any suitable manner but for purposes of convenience let it be assumed that it is graduated in degrees, and has a total extent of 60 degrees (corresponding to four times the angular distance between a given pair of adjacent recesses 13), with its zero reading located so as to register with RMLS.

Now by reference to the graduations on the dial 40 it will be noted that the recess 13n is located about 20.5 degrees from RMLS while the recess 13o is displaced about 9.5 degrees from RMLS. It may here be noted that once the angular displacement of one of the said recesses (13n or 13o) is ascertained with respect to RMLS, the angle of the remaining recess may be determined without reference to the dial 40 since the total displacement between the two selected recesses is 30 degrees.

When the dial 40 or other similar indicating-means is employed which is graduated in degrees, reference may be had to a suitable table to determine the approximate weight-values which should be possessed by the correcting-screws 38 and 39. A suitable table under the present circumstances is given below:

| Angle from RMLS (degrees) | Weight-Value for Correcting-Screws (UOPU) | Angle from RMLS (degrees) | Weight-Value for Correcting-Screws (UOPU) | Angle from RMLS (degrees) | Weight-Value for Correcting-Screws (UOPU) |
|---|---|---|---|---|---|
| 0 | 60 | 11 | 39 | 21 | 19 |
| 1 | 58 | 12 | 37 | 22 | 16.5 |
| 2 | 56.5 | 13 | 35 | 23 | 14.5 |
| 3 | 54.5 | 14 | 33 | 24 | 12.5 |
| 4 | 52.5 | 15 | 31 | 25 | 10.5 |
| 5 | 50.5 | 16 | 29 | 26 | 8.5 |
| 6 | 49 | 17 | 27 | 27 | 6 |
| 7 | 47 | 18 | 25 | 28 | 4 |
| 8 | 45 | 19 | 23 | 29 | 2 |
| 9 | 43 | 20 | 21 | 30 | 0 |
| 10 | 41 | | | | |

Now since it has been previously ascertained that the recess 13n is about 20.5 degrees from RMLS, reference to the table above will show that the correcting-screw 38 should have a weight-value of substantially 20 UOPU. Now since the distance of the recess 13o from RMLS is about 9.5 degrees it will be seen that the weight-value of the correcting-screw 39 should be about 42 UOPU.

Should it be desired to employ two of the immediately-adjacent recesses, such as 13o and 13p (15° apart) rather than the more remote recesses 13n and 13o (30° apart) for the reception of balancing-screws, the weight-values for suitable balancing-screws may be determined by reference to the following table:

| Angle from RMLS (degrees) | Weight-Value for Correcting-Screws (UOPU) | Angle from RMLS (degrees) | Weight-Value for Correcting-Screws (UOPU) | Angle from RMLS (degrees) | Weight-Value for Correcting-Screws (UOPU) |
|---|---|---|---|---|---|
| 0 | 60 | 6 | 36.2 | 11 | 16.2 |
| 1 | 56 | 7 | 32.2 | 12 | 12.1 |
| 2 | 52.1 | 8 | 28.3 | 13 | 8.1 |
| 3 | 48.2 | 9 | 24.2 | 14 | 4 |
| 4 | 44.2 | 10 | 20.2 | 15 | 0 |
| 5 | 40.2 | | | | |

*Résumé*

From the foregoing it will be seen that regardless of the angular distances between the two recesses in which it is desired to install correcting-screws, a proper weight-value (in UOPU) for a given correcting-screw may be determined in accordance with the following formula:

Weight-value for correcting-screw=CHS (cosine of angle between recess and RMLS—sine of angle between said recess and RMLS×cotangent of angle between the said recess and the other recess which it is desired to use).

To make clear the foregoing formula, let it be assumed that the two selected recesses are the recesses 13c and 13d (Fig. 4). When determining the proper weight value to be added to the recess 13c, the formula may be stated mathematically as follows:

$$CHS(\cos a' - \sin a' \cot b)$$

When determining the proper weight value to be added to the recess 13d (Fig. 4), the mathematical formula would be $$CHS(\cos a'' - \sin a'' \cot b)$$

The above formula may also be used for determining proper weight-values for balancing-screws by substituting BHS for CHS and RMLS. For instance (see Fig. 3), in determining the proper weight value to be added to the recess 13a, the mathematical formula would be $$BHS(\cos a' - \sin a' \cot b)$$

Similarly, in determining the proper weight value to be added to the other recess 13b, the mathematical formula would be $$BHS(\cos a'' - \sin a'' \cot b)$$

Furthermore, it will be seen that the amount of unbalance remaining in a balance-wheel after being subjected to the method of the present invention, equals the difference between the respective weight-values of RMLS and CHS. CHS being a controllable factor, the value of RMLS may be determined by the following formula in order to give a desired value to CHS:

$$RMLS = \sqrt{\frac{BHS^2 - 2 \times BHS \times IMLS \times \text{cosine of angle between } IMLS \text{ and } BHS + IMLS^2}{}}$$

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The method for poising a timepiece balance-wheel having a series of preformed circumferentially-spaced-apart recesses, which method includes the steps of: providing the said balance-wheel with a balancing heavy spot effective at a point displaced circumferentially between about 55° and 95° from the inherent mean light spot of the balance-wheel; installing a first correcting-weight in a first recess in the balance-wheel to one side of the resultant mean light spot therein, the said first correcting-weight having a weight-value determined by the angular distance between the said first recess and the said resultant mean light spot; installing a second correcting-weight in a second recess located in the said balance-wheel on the opposite side of the said resultant mean light spot from the said first recess, the said second correcting-weight also having a weight-value determined by the angular distance between the said second recess and the said resultant mean light spot, the sum of the respective weight-values of both of the said correcting-weights being substantially equal to the effective weight-value of the said resultant mean light-spot though of opposite sign thereto.

2. The method for poising a timepiece balance-wheel having a series of preformed circumferentially-spaced-apart recesses, which method includes the steps of: installing a balancing-weight in a recess in the said balance-wheel effective at a point displaced circumferentially between about 55° and 95° from the inherent mean light spot of the balance-wheel; installing a first correcting-weight in a first recess in the balance-wheel to one side of the resultant mean light spot therein, the said first correcting-weight having a weight-value determined by the angular distance between the said first recess and the said resultant mean light spot; installing a second correcting-weight in a second recess located in the said balance-wheel on the opposite side of the said resultant mean light spot from the said first recess, the said second correcting-weight also having a weight-value determined by the angular distance between the said second recess and the said resultant mean light spot, the sum of the respective weight-values of both of the said correcting-weights being substantially equal to the effective weight-value of the said resultant mean light-spot though of opposite sign thereto.

3. The method for poising a timepiece balance-wheel having a series of preformed circumferentially-spaced-apart recesses, which method includes the steps of: providing the said balance-wheel with a balancing heavy spot effective at a point displaced circumferentially between about 70° and 90° from the inherent mean light spot of the balance-wheel; installing a first correcting-weight in a first recess in the balance-wheel to one side of the resultant mean light spot therein, the said first correcting-weight having a weight-value determined by the angular distance between the said first recess and the said resultant mean light spot; installing a second correcting-weight in a second recess located in the said balance-wheel on the opposite side of the said resultant mean light spot from the said first recess, the said second correcting-weight also having a weight-value determined by the angular distance between the said second recess and the said resultant mean light spot, the sum of the respective weight-values of both of the said correcting-weights being substantially equal to the effective weight-value of the said resultant mean light-spot though of opposite sign thereto.

4. The method for poising a timepiece balance-wheel having a series of preformed circumferentially-spaced-apart recesses, which method includes the steps of: installing a balancing-weight in a recess in the said balance-wheel effective at a point displaced circumferentially between about 70° and 90° from the inherent mean light spot of the balance-wheel; installing a first correcting-weight in a first recess in the balance-wheel to one side of the resultant mean light spot therein, the said first correcting-weight having a weight-value determined by the angular distance between the said first recess and the said resultant mean light spot; installing a second correcting-weight in a second recess located in the said balance-wheel on the opposite side of the said resultant mean light spot from the said first recess, the said second correcting-weight also having a weight-value determined by the angular distance between the said second recess and the said resultant mean light spot, the sum of the respective weight-values of both of the said correcting-weights being substantially equal to the effective weight-value of the said resultant mean light-spot though of opposite sign thereto.

5. The method for poising a timepiece balance-wheel having a series of preformed circumferentially-spaced-apart recesses, which method includes the steps of: selecting a spot on the balance-wheel intermediate its inherent mean heavy spot and its inherent mean light spot within the range from about 55° to about 100° from the inherent mean light spot thereof; installing a first balancing-weight in a first recess to one side of the said selected spot; installing a second balancing-weight in a second recess located on the opposite side of the said selected spot from the said first recess; installing a first correcting-weight in a third recess to one side of the resultant mean light spot in the balance-wheel, the said first correcting-weight having a weight-value determined by the angular distance between the said third recess and the said resultant mean light spot; installing a second correcting-weight in a fourth recess located on the opposite side of the resultant mean light spot from the said third recess, the said second correcting-weight also having a weight-value determined by the angular distance between the said fourth recess and the resultant mean light spot, the sum of the respective weight-values of both of the said correcting-weights being substantially equal to the effective weight-value of the said resultant mean light-spot though of opposite sign thereto.

6. The method for poising a timepiece balance-wheel having a series of preformed circumferentially-spaced-apart recesses, which method includes the steps of: selecting a spot on the balance-wheel intermediate its inherent mean heavy spot and its inherent mean light spot within the range from about 55° to about 100° from the inherent mean light spot thereof; installing a first balancing-weight in a first recess to one side of the said selected spot, the said first balancing-weight having a weight-value determined by the angular distance between the said first recess and the said selected spot; installing a second balancing-weight in a second recess located on the opposite side of the said selected spot from the said first recess, the said second balancing-weight also having a weight-value determined by the angular distance between the said second recess and the said selected spot; installing a first correcting-weight in a third recess to one side of the resultant mean light spot in the balance-wheel, the said first correcting-weight having a weight-value determined by the angular distance between the said third recess and the said resultant mean light spot; installing a second correcting-weight in a fourth recess located on the opposite side of the resultant mean light spot from the said third recess, the said second correcting-weight also having a weight-value determined by the angular distance between the said fourth recess and the resultant mean light spot, the sum of the respective weight-values of both of the said correcting-weights being substantially equal to the effective weight-value of the said resultant mean light-spot though of opposite sign thereto.

WALTER KOHLHAGEN.

REFERENCES CITED

The following references are of record in the file of this patent:

UNITED STATES PATENTS

| Number | Name | Date |
| --- | --- | --- |
| 1,171,172 | Coppage | Feb. 8, 1916 |
| 2,079,902 | De Witt | May 11, 1937 |
| 2,195,252 | McKinley et al. | Mar. 26, 1940 |